US012619039B2

(12) United States Patent
Lin et al.

(10) Patent No.: US 12,619,039 B2
(45) Date of Patent: May 5, 2026

(54) OPTICAL FIBER COMBINER WITH A HEAT SINK AND METHOD OF DISSIPATING HEAT USING SAME IN A VACUUM

(71) Applicants: Yu-Hsiang Lin, Tainan (TW); Chin-Feng Su, Tainan (TW)

(72) Inventors: Yu-Hsiang Lin, Tainan (TW); Chin-Feng Su, Tainan (TW)

(73) Assignee: Photonicore Technologies Co., Ltd., Kaohsiung (TW)

( * ) Notice: Subject to any disclaimer, the term of this patent is extended or adjusted under 35 U.S.C. 154(b) by 282 days.

(21) Appl. No.: 18/380,670

(22) Filed: Oct. 17, 2023

(65) Prior Publication Data

US 2024/0085647 A1     Mar. 14, 2024

(51) Int. Cl.
*H04B 10/00*     (2013.01)
*G02B 6/42*     (2006.01)

(52) U.S. Cl.
CPC ......... *G02B 6/4269* (2013.01); *G02B 6/4243* (2013.01)

(58) Field of Classification Search
CPC ... G02B 6/4269; G02B 6/4243; G02B 6/2808
See application file for complete search history.

(56) References Cited

U.S. PATENT DOCUMENTS

| | | | | |
|---|---|---|---|---|
| 10,209,453 B1 * | 2/2019 | Hsia | ...................... | G02B 6/3624 |
| 10,288,802 B2 * | 5/2019 | Bilodeau | ................... | G02B 6/44 |
| 11,831,121 B2 * | 11/2023 | Lugo | ...................... | H01S 3/0064 |
| 2008/0050069 A1 * | 2/2008 | Skovgaard | ........... | G02B 6/2856 |
| | | | | 385/24 |
| 2010/0135339 A1 * | 6/2010 | Meleshkevich | .... | G02B 6/03616 |
| | | | | 385/124 |
| 2011/0110625 A1 * | 5/2011 | Chatigny | ............. | G02B 6/3636 |
| | | | | 156/60 |
| 2012/0070115 A1 * | 3/2012 | Langseth | ................. | G02B 6/14 |
| | | | | 427/163.2 |
| 2013/0136146 A1 * | 5/2013 | Creeden | ........... | H01S 3/094053 |
| | | | | 372/6 |
| 2013/0315548 A1 * | 11/2013 | Salokatve | ............ | G02B 6/4429 |
| | | | | 29/428 |
| 2014/0211818 A1 * | 7/2014 | Hou | ...................... | H01S 3/06729 |
| | | | | 372/6 |
| 2014/0270637 A1 * | 9/2014 | Desbiens | ............. | G02B 6/0288 |
| | | | | 385/29 |
| 2017/0153400 A1 * | 6/2017 | Kasai | ...................... | H01S 5/0071 |
| 2017/0329085 A1 * | 11/2017 | Kliner | ................... | G02B 6/036 |
| 2018/0321440 A1 * | 11/2018 | Bilodeau | ............. | G02B 6/4267 |
| 2019/0146159 A1 * | 5/2019 | Lin | ...................... | G02B 6/3648 |
| | | | | 385/134 |
| 2024/0085647 A1 * | 3/2024 | Lin | ...................... | G02B 6/2808 |

* cited by examiner

*Primary Examiner* — Agustin Bello

(57)     ABSTRACT

An optical fiber combiner includes optical fiber components including a predetermined area and a refractive index portion formed on the predetermined area; a housing including a channel with the optical fiber components disposed through, fastening members for fastening the optical fiber components, and a cover for sealing the channel; and a conductive material disposed in the channel. In response to laser beams impinging on the optical fiber components, heat is generated by the refractive index portion, the heat is absorbed by the conductive material, and the heat is further transferred to the housing and the cover by thermal conduction for dissipation.

1 Claim, 5 Drawing Sheets

| Encapsulation type | long time operation in an atmospheric environment | long time operation in a vacuum | long time operation in an atmospheric environment ( performance) | long time operation in a vacuum ( performance) |
|---|---|---|---|---|
| The conventional art | long time operation is possible | long time operation is impossible | optical output characteristics are maintained | output power decreased prior to being burned |
| The invention | long time operation is possible | long time operation is possible | optical output characteristics are maintained | optical output characteristics are maintained |

FIG. 5

OPTICAL FIBER COMBINER WITH A HEAT SINK AND METHOD OF DISSIPATING HEAT USING SAME IN A VACUUM

BACKGROUND OF THE INVENTION

1. Field of the Invention

The invention relates to heat sinks for an optical fiber and more particularly to a sealed optical fiber combiner filled with a conductive material as a heat sink and a method of dissipating heat from optical fiber components in the optical fiber combiner using the heat sink in a vacuum.

2. Description of Related Art

An optical fiber is a flexible glass or plastic fiber that can transmit light from one end to the other. Such fibers find wide usage in fiber-optic communications, where they permit transmission over longer distances and at higher bandwidths than electrical cables. Fibers are used instead of metal wires because signals travel along them with less loss. In addition, fibers are immune to electromagnetic interference, a problem from which metal wires suffer. Fibers are also used for illumination and imaging. Specially designed fibers are also used for a variety of other applications, such as optical fiber sensors and fiber lasers.

Different from conventional optical fiber applications, optical fiber components need to withstand light energy loads and need to be equipped with a heat dissipation mechanism. Otherwise, the optical fiber components will fail due to high temperatures, resulting in damage to the optical fiber system.

Referring to FIG. 1, it shows the encapsulation of a conventional optical fiber combiner which comprises an aluminum heat sink 11, a glass substrate 12 mounted in the heat sink 11, an optical fiber component 13 disposed through the heat sink 11, a glass cover 14 mounted on the heat sink 11, and a cover member 15 disposed on both the heat sink 11 and the glass cover 14. In an atmospheric environment, heat generated by the optical fiber component 13 can be sufficiently dissipated by means of thermal convention, by means of thermal radiation through the glass substrate 12 and the glass cover 14, and by means of thermal conduction through the heat sink 11 and the cover member 15. However, convection is impossible in a vacuum (e.g., low altitude orbit or devices operating in a vacuum) due to devoid of air. As such, heat may quickly accumulate on the optical fiber component 13, thereby damaging the optical fiber component 13.

Thus, the need for improvement still exists.

SUMMARY OF THE INVENTION

It is therefore one object of the invention to provide an optical fiber combiner comprising a plurality of optical fiber components including a predetermined area and a refractive index portion formed on the predetermined area; a housing including a channel with the optical fiber components disposed through, a plurality of fastening members for fastening the optical fiber components, and a cover for sealing the channel; and a conductive material disposed in the channel.

The invention has the following advantages and benefits in comparison with the conventional art:

The invention is applicable to a vacuum because there is no convection in a vacuum. In response to laser beams impinging on the optical fiber components, heat is generated by the low refractive index portion. The unwanted heat is absorbed by the conductive material and the heat is in turn transferred to the housing and the cover by thermal conduction. As a result, the heat is dissipated. This has the advantage of prolonging the useful life of the optical fiber combiner.

In addition to the heat dissipation by thermal conduction, the heat is dissipated by thermal radiation from both the housing and the cover because they are formed of a material having an excellent thermal radiation capability.

In a vacuum of equal to or less than $10^{-5}$ tor, the invention can operate for a long time and maintain optical output characteristics without damaging the optical fiber components.

The above and other objects, features and advantages of the invention will become apparent from the following detailed description taken with the accompanying drawings.

BRIEF DESCRIPTION OF THE DRAWINGS

FIG. 5 is a table tabulating the conventional optical fiber combiner and the optical fiber combiner of the invention in terms of operations in an atmospheric environment and a vacuum.

DETAILED DESCRIPTION OF THE INVENTION

Figure 1:
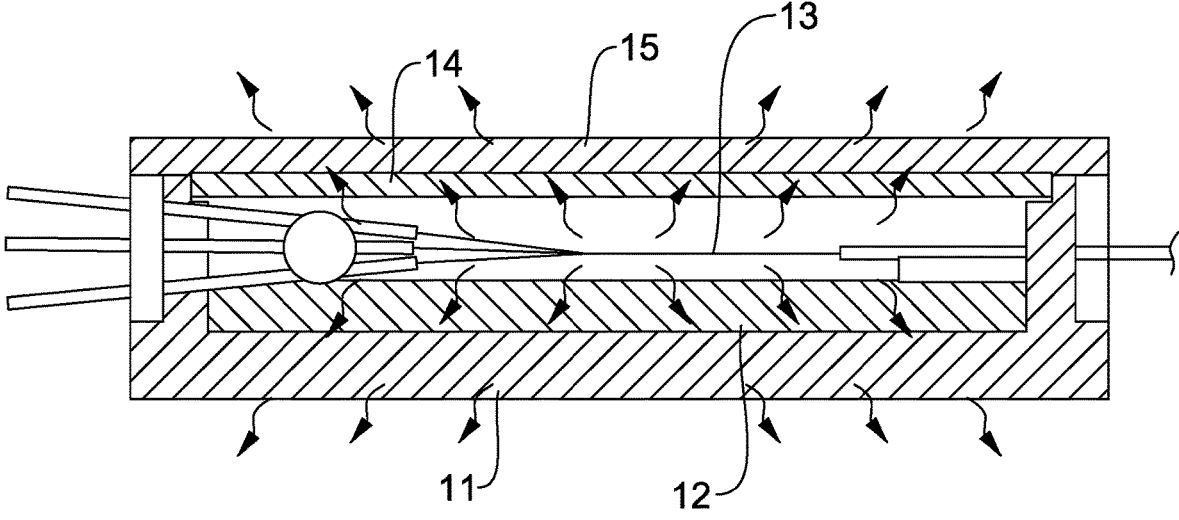
FIG. 1 is a longitudinal sectional view of a conventional optical fiber combiner.
Figure 2:
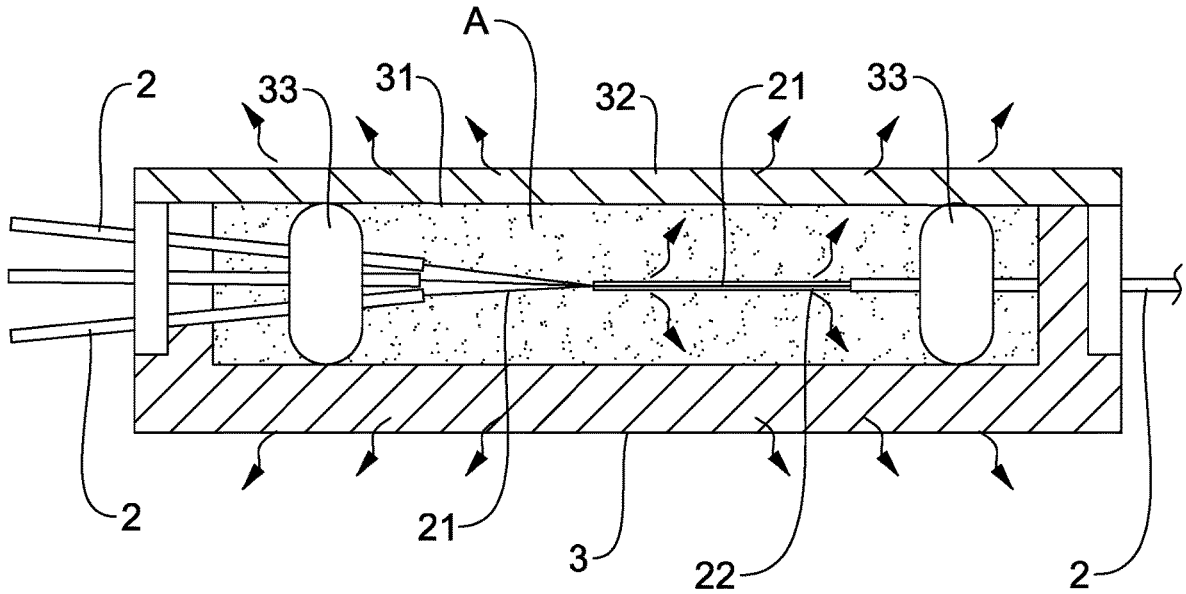
FIG. 2 is a longitudinal sectional view of an optical fiber combiner with a heat sink and method of dissipating heat using same in a vacuum according to the invention.
Figure 3:
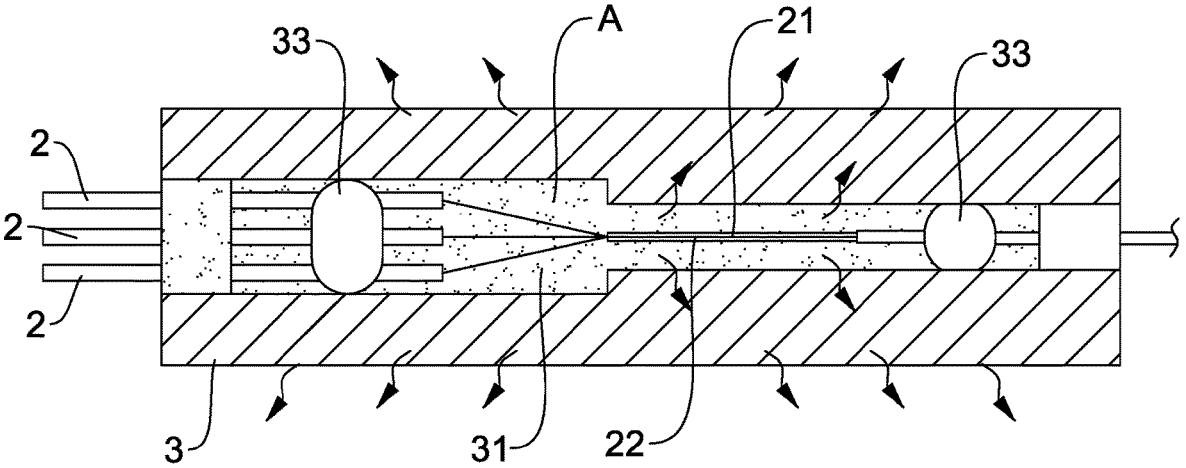
FIG. 3 is a top view of FIG. 2.

Referring to FIGS. 2 to 5, an optical fiber combiner with a heat sink and method of dissipating heat using same in a vacuum in accordance with the invention comprises a plurality of optical fiber components 2 and a housing 3 as detailed below.

The optical fiber components 2 are disposed in the housing 3. A predetermined area 21 of the optical fiber component 2 is coated with a material having a low refractive index so as to form a low refractive index portion 22 on the predetermined area 21. The material having a low refractive index less than 1.45 is one having an infrared wavelength of 800 nm to 1600 nm.

The housing 3 includes a channel 31 with the optical fiber components 2 disposed through, and a plurality of fastening members 33 for fastening the optical fiber components 2. The fastening members 33 are made of a predetermined material capable of releasing gas in a low vacuum and the predetermined material is configured to evaporate at a condensation percentage less than 5 wt %. The channel 31 is filled with a conductive material A. The housing 3 further comprises a cover 32 for sealing the channel 31. The conductive material A is a heat dissipation adhesive, a heat dissipation paste or a heat sink liquid. The conductive material A is a conductive material capable of releasing gas in a low vacuum and the conductive material is configured to evaporate at a condensation percentage less than 5 wt %. The housing 3 and the cover 32 are formed of a material having an excellent thermal radiation capability (e.g., ceramic, graphite, or metal) capable of emitting thermal radiation at a rate greater than 0.6.

The invention is applicable to a vacuum because there is no convection in a vacuum. In response to laser beams impinging on the optical fiber components 2, heat is generated by the low refractive index portion 22. The unwanted heat is absorbed by the conductive material A. And in turn, the heat is transferred to the housing 31 and the cover 32 by thermal conduction. As a result, the heat is dissipated. This has the advantage of prolonging the useful life of the optical fiber combiner.

Further, the heat is dissipated by thermal radiation from both the housing 3 and the cover 32 because they are formed of a material having an excellent thermal radiation capability.

Figure 4:
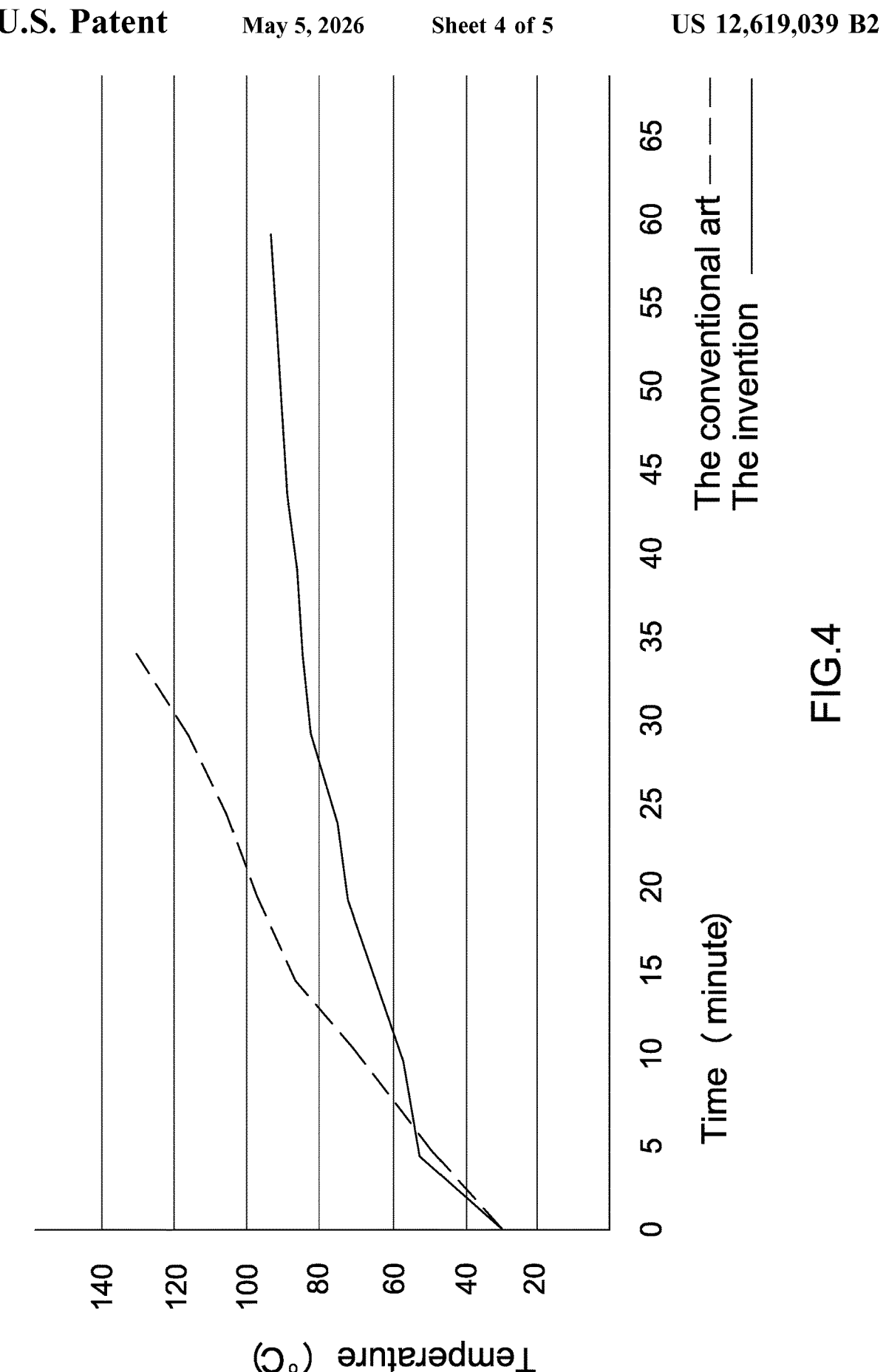
FIG. 4 is a chart of the conventional optical fiber combiner versus the optical fiber combiner of the invention in terms of temperature change and time.

As shown in FIG. 4 specifically, it is a chart of the conventional optical fiber combiner versus the optical fiber combiner of the invention in terms of temperature increase and time in a vacuum of equal to or less than $10^{-5}$ tor. It is found that temperature of the conventional optical fiber combiner is increased greatly as time passes prior to being damaged and in contrast, temperature of the optical fiber combiner of the invention is increased gradually to a stable state (i.e., almost no temperature increase) as time passes. In detail, temperature of the optical fiber combiner of the invention does not increase quickly after one hour of use due to sufficient heat dissipation. In contrast, temperature of the conventional optical fiber combiner is increased to 130° C. after 35 minutes of use. Thus, the conventional optical fiber combiner is damaged. It is noted that only thermal conduction and thermal radiation are possible means of dissipating heat in a vacuum of equal to or less than $10^{-5}$ tor. Thus, a laser system incorporating the conventional optical fiber combiner may be damaged due to the accumulation of heat.

Results of the comparison in FIG. 4 are further tabulated in FIG. 5.

While the invention has been described in terms of preferred embodiments, those skilled in the art will recognize that the invention can be practiced with modifications within the spirit and scope of the appended claims.

What is claimed is:

1. An optical fiber combiner, comprising:
   a plurality of optical fiber components including a predetermined area and a refractive index portion formed on the predetermined area;
   a housing including a channel with the optical fiber components disposed through, a plurality of fastening members for fastening the optical fiber components, and a cover for sealing the channel; and
   a conductive material disposed in the channel;
   wherein the conductive material is a predetermined conductive material capable of releasing gas in a vacuum of equal to or less than $10^{-5}$ tor and the predetermined conductive material is configured to evaporate at a condensation percentage less than 5 wt %;
   wherein the fastening members are made of a predetermined material capable of releasing gas in a vacuum of equal to or less than $10^{-5}$ tor and the predetermined material is configured to evaporate at a condensation percentage less than 5 wt %; and
   wherein the refractive index portion is formed of a material having a refractive index less than 1.45 and an infrared wavelength of 800 nm to 1600 nm.

* * * * *